we# 2,947,719
METHOD OF POLYMERIZING VINYL CHLORIDE IN THE PRESENCE OF POLYETHYLENE AND PRODUCT PRODUCED THEREBY

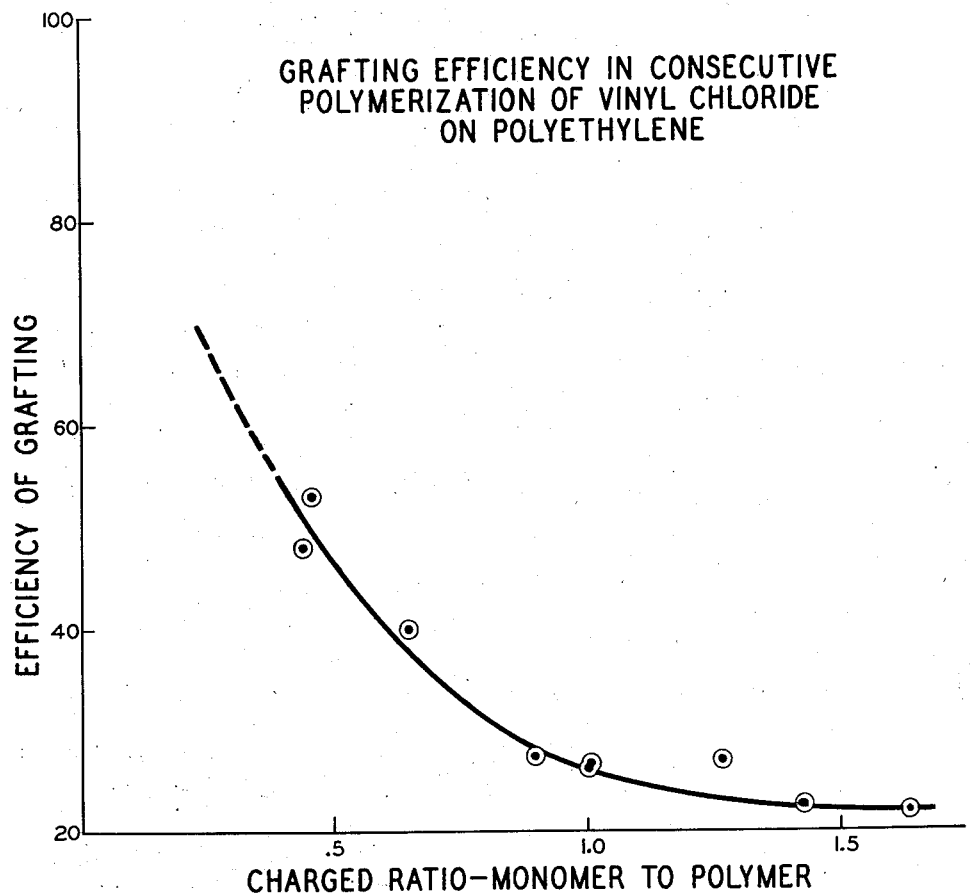

Frank M. Rugg, West Caldwell, and James E. Potts, Roseland, N.J., assignors to Union Carbide Corporation, a corporation of New York Filed Sept. 9, 1954, Ser. No. 454,922

7 Claims. (Cl. 260—45.5)

This invention relates to thermoplastic reaction products of polyethylene and vinyl chloride.

Polyethylenes are wax-like products having average molecular weights from about 500 to 40,000 and even higher, and which are usually obtained by the polymerization of ethylene at extremely high pressures in the presence of or absence of oxygen as a catalyst. The preparation of solid polymers of ethylene is described in U.S. Patents 2,153,553 and 2,188,465. While polyethylenes have many desirable properties including toughness, pliability and chemical inertness, and resistance to many solvents, they are on the other hand lacking in flame resistance, are subject to stress cracking under certain conditions, and are not receptive to coatings, inks or adhesives.

It has been proposed to prepare interpolymers of ethylene and polymerizable organic compounds containing one or more double bonds such as vinyl chloride, styrene, butadiene and the like. These interpolymers were characterized as being either (1) mixed single chain polymers in which the ethylene groups are interposed with linearly recurring units or groups of the polymerizable organic compound; or (2) cross-linked compounds in which single chains of the ethylene polymer type, or of the mixed single chain type, are linked directly or via intermediate groups.

It has also been proposed to form ethylene-modified polymers by heating pre-existing polymers such as polyvinyl esters, polyamides, cellulose and others with ethylene under pressure of from 50 to 1500 atmospheres and in the presence of a free radical producing compound as a catalyst. These ethylene-modified polymers are alleged to contain substituent ethylene or polyethylene groups attached to the pre-existing polymeric chain.

It is also known to mechanically mix polyethylene with other polymers as for example, polyisobutylene, polyvinyl chloride, polystyrene and other vinyl polymers. Useful mixtures are obtained where the other polymer, as for example, polyisobutylene is at least partially compatible with polyethylene. But with incompatible polymers, such as polystyrene and polyvinyl chloride, the resultant mixtures of polyethylene and polyvinyl chlorides or polyethylene and polystyrene are lacking in homogeneity as evidenced by the blushing developed on flexure of articles molded from such mixtures. Moreover, the non-homogeneous mixtures are rapidly attacked by solvents which ordinarily do not affect polyethylene but in which the other polymer is soluble.

In all of the aforementioned proposals and expedients for forming modified polymers or polymeric mixtures, there has been neither contemplated nor provided a modified copolymer of ethylene wherein the essentially linear chains of ethylene groups characterizing polyethylene is preserved substantially intact, and modified only by random attachment as side chains to said linear chains of groups other than ethylene, whereby the resultant modified polymer retains much of the original and normal properties of polyethylene but nevertheless due to the presence of the chemically combined groups exhibits properties unobtainable from mere mixtures of polyethylene and other polymers, or from polymerizing ethylene in the presence of other polymers, or by copolymerizing ethylene with other monomers.

In accordance with the present invention it has now been found that by reacting polyethylene with vinyl chloride monomer under suitable conditions, there is formed a novel polymeric compound which is unlike either polyethylene or polyvinyl chloride, or the copolymer of ethylene and vinyl chloride or simple mixtures of polyethylene and polyvinyl chloride.

The novel polyethylene-vinyl chloride reaction product formed by the polymerization of vinyl chloride in the presence of polyethylene is herein designated a graft copolymer, inasmuch as all the available evidence indicates that the new polymer contains polymerized vinyl chloride of indeterminate chain length as side chains attached to linear polyethylene chains.

While the mechanism of the reaction has not been fully determined, it is believed that in the reaction part of the vinyl chloride, the amount depending on reaction conditions, becomes chemically combined as side chains on a portion of the polyethylene. Also, some of the vinyl chloride polymerizes to the vinyl chloride homopolymer. This can be graphically illustrated as follows where P represents an ethylene segment

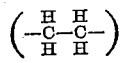

in a polyethylene chain and V represents a vinyl chloride segment

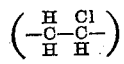

of a polyvinyl chloride chain.

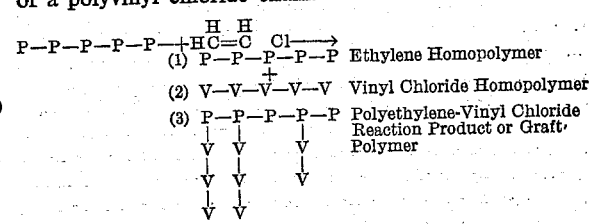

The graft polymer can be conveniently prepared by reacting the vinyl chloride monomer with polyethylene which is preferably in solution in a solvent for polyethylene such as an aromatic hydrocarbon as exemplified by benzene, toluene and xylene and preferably under sufficient pressure to maintain a solution of the vinyl chloride in the polyethylene solvent. The presence of a peroxide type catalyst is most effective in promoting the desired reaction. The peroxide catalyzed reaction proceeds smoothly at temperatures from about 50° C. to 100° C. Reaction temperatures above 100° C. while somewhat effective in accelerating the reaction, tend to promote decomposition of the polymerized vinyl chloride.

Usually the reaction requires from 5 to 24 hours to consume a major amount of the vinyl chloride monomer in the formation of graft polymer and vinyl chloride homopolymer. Upon obtaining a desired yield of reaction products, the solvent and any unreacted vinyl chloride monomer is removed from the reaction products, as for example, by vacuum drying. The residue remaining after drying is a homogeneous gross reaction product containing ethylene homopolymer, vinyl chloride homopolymer, and the reaction product or graft copolymer of polyethylene and vinyl chloride.

The vinyl chloride homopolymer in the gross reaction product can be extracted therefrom by dissolving the mixture in boiling cyclohexanone which is a solvent for all three components of the mixture, then diluting the cyclohexanone solution with an excess of a solvent for polyvinyl chloride such as acetone which precipitates the graft copolymer along with polyethylene homopolymer, the vinyl chloride homopolymer remaining in solution. An alternative method may be employed in which the homogeneous mixture on completion of the reaction is diluted with more of the solvent used in the reaction, namely, benzene or toluene as the case may be, and then an excess of acetone added to precipitate the graft copolymer and polyethylene homopolymer.

The formation of vinyl chloride homopolymer along with graft copolymer can be controlled, we have discovered, by varying the weight ratio of vinyl chloride to polyethylene in the initial mixture charged to the reactor. Thus we have found that generally speaking as the ratio of vinyl chloride to polyethylene increases, the amount of vinyl chloride homopolymer in the reaction product also increases, as does the content of polymerized vinyl chloride in the graft copolymer.

In the accompanying drawing there is graphically plotted percent efficiency of grafting versus charged weight ratios of vinyl chloride monomer to polyethylene. "Percent efficiency of grafting" means that percent of all the polymerized vinyl chloride which has formed a graft copolymer with polyethylene; the remaining percent of polymerized vinyl chloride being that which has formed vinyl chloride homopolymer.

Separation of the ethylene homopolymer and the graft copolymer is difficult due to their similar solubilities and for many uses such separation is not required.

The properties of the gross reaction product, i.e. the product containing the three components ethylene homopolymer, vinyl chloride homopolymer and graft polymer when compared to a reaction product free of vinyl chloride homopolymer will vary considerably depending on the amount of vinyl chloride homopolymer.

Thus, as the amount of vinyl chloride homopolymer is increased, films (0.01 inch thick) pressed from the product are less flexible, have less transparency, and have lower tear resistance than similar films pressed from a product which contains none or only a small amount (1%–5%) of said homopolymer. For example, a gross reaction product containing 50% total polymerized vinyl chloride, of which 39% is vinyl chloride homopolymer, and 11% polymerized vinyl chloride in the form of graft copolymer, in film form is stiff, translucent, has poor crease and tear resistance and blushes when creased or torn. On removal of vinyl chloride homopolymer by solvent extraction procedures a product now containing a content of 18% polymerized vinyl chloride in the form of graft polymer is obtained which is transparent, colorless, flexible, has good tear and crease resistance, does not blush when creased or torn and can be cold drawn without blushing.

A gross reaction product from which vinyl chloride homopolymer had been removed by solvent extraction containing 10.7% polymerized vinyl choride in the form of graft polymer was injection molded at 230° F. and 17,000 p.s.i. pressure to give test bars having tensile strengths of the order of 1920 p.s.i. and modulus of elasticity of 20,000 p.s.i. Films pressed from this product were transparent, flexible, could be cold drawn and creased without blushing, and demonstrated good tear resistance.

On the other hand, if the vinyl chloride homopolymer content does not exceed 25% by weight in the gross reaction product, such products exhibit higher modulus of elasticity and tensile strength than polyethylene and have good flex life. For example, a gross reaction product containing 17% vinyl chloride homopolymer and 11% grafted polymerized vinyl chloride was injection molded at 120° C. and at a pressure of 17,900 p.s.i. The tensile strength of this molded product was 2,500 p.s.i. at 25° C. and the modulus of elasticity was 30,000 p.s.i. Test bars of this material could be flexed repeatedly without failure.

The invention is further illustrated by the following examples.

Example 1

(a) Seventy-five grams of polyethylene of 21,000 average molecular weight were dissolved in 375 grams of benzene at 70° C. in a pressure reactor. The reactor system was sealed and the air displaced by nitrogen. 0.75 gram benzoyl peroxide in 10 cc. benzene and 123.5 grams of vinyl chloride were added to the solution under pressure. The reaction was continued for nine hours at a temperature of 70° C. and a gauge pressure of 95 p.s.i. The resulting thermoplastic reaction product was freed of solvent and dried in vacuo at 80° C. The total yield of thermoplastic solids was 101.2 grams and based on the yield, the polymerized vinyl chloride content of the product was 25.9 percent. Analysis of the product for chlorine gave a value of 15.6 percent chlorine, or a total polymerized vinyl chloride content of 27.5 percent. By extraction of this product with cyclohexanone and subsequent chlorine analysis (as detailed in (b) and (c) seqq.) it was determined that this product originally contained 21.5 percent vinyl chloride homopolymer and 6% polymerized vinyl chloride in the form of graft copolymer. A 10 mil film of this product before extraction was nearly transparent, tough, somewhat stiff and showed a slight tendency to blush when creased.

(b) Twenty grams of the original product from (a) were dissolved in 500 grams of boiling cyclohexanone. The solution was cooled and 300 grams of acetone added, causing precipitation of a white granular, precipitate which was easily filtered off, washed thoroughly with acetone, and then dried overnight in vacuo at a temperature of 80° C. The yield was 16.5 grams. Analysis of the product for total chlorine revealed a polymerized vinyl chloride content of 8.6 percent. A 10 mil pressed film was transparent, tough, flexible and did not blush when creased.

(c) A five gram portion of the product from (b) was again extracted with cyclohexanone. The yield of acetone washed and dried precipitate was 4.7 grams. The polymerized vinyl chloride content of this product was 7.6 percent by total chlorine analysis.

Example 2

(a) One hundred fifty grams of polyethylene as in Example 1 were dissolved with the aid of heat in 750 grams benzene contained in a pressure reactor. The reactor system was sealed and the air displaced with nitrogen. The solution was heated to 70° C. and 1.5 grams of benzoyl peroxide and 144 grams vinyl chloride added under pressure. A slight leak caused a loss in vinyl chloride so an additional 117 grams vinyl chloride were added. The reaction was continued for 23 hours at a temperature of 65° C.–75° C. and an average gauge pressure of about 95 p.s.i. The resulting homogeneous gross reaction product was freed of solvent and dried overnight in vacuo at a temperature of 80° C. Total yield of product was 197.9 grams which by chlorine analysis showed a content of 23.8 percent of polymerized vinyl chloride.

(b) Thirty grams of the product from (a) were dissolved in 700 grams of boiling cyclohexanone. Upon cooling to 100° C. a fine precipitate formed at which point 300 grams of acetone were added. The mixture was cooled to room temperature and filtered. The filtered precipitate was added to 800 cc. of acetone and refiltered. Yield of precipitate was 27.3 grams and it contained 8.1 percent of polymerized vinyl chloride by infrared analysis.

(c) Twenty grams of the product from (b) were dissolved in 500 grams boiling cyclohexanone. The solution was cooled to 100° C., acetone added as in (b) and the cooled mixture filtered. Yield of precipitate was 18.4 grams which contained 7.8 percent polymerized vinyl chloride by infrared analysis.

(d) 18.4 grams of the product from (c) were extracted with boiling cyclohexanone as described in (b). The precipitate contained 7.1 percent polymerized vinyl chloride by infrared analysis.

(e) The product from (d) was extracted with boiling cyclohexanone as described in (b). The precipitate contained 7.1 percent polymerized vinyl chloride by infrared analysis.

The above experiments indicate that essentially all of the free vinyl chloride homopolymer is removed from the product of (a) in the first extraction with cyclohexanone and precipitation with acetone.

(f) Seventy grams of the reaction product from (a) were dissolved in 1750 grams of boiling cyclohexanone, the solution was allowed to cool and an excess of acetone added and the resulting precipitate collected and dried as described in (b). Yield of the fine white precipitate was 45.2 grams and it contained 6.97 percent polymerized vinyl chloride by infrared analysis. When compression molded in bars at 220° F. and 15,000 p.s.i. pressure, it had an average tensile strength of 1530/in.$^2$ and a percent elongation of 244. It was stiffer than the polyethylene used in the reaction in (a).

*Example 3*

(a) One hundred fifty grams of polyethylene were dissolved with heat in 750 grams benzene contained in a pressure reactor. 1.5 gms. benzoyl peroxide and 159.4 grams of vinyl chloride were added under a gauge pressure of 95–100 p.s.i. in a manner similar to that described in Example 1. The reaction mixture was held at 68° C.–72° C. for nine hours. Yield of reaction product was 178.0 grams which contained a total of 23.8 grams polymerized vinyl chloride as determined by chlorine analysis. A film pressed at 110° C. from this product was quite stiff, transparent and very tough. The product contained 17.5 percent vinyl chloride homopolymer as determined by extraction with cyclohexanone with subsequent analysis for chlorine. The content of polymerized vinyl chloride as graft copolymer was 6.3%.

(b) One hundred fifty grams of polyethylene were dissolved with heat in 750 grams benzene and reacted with 155 grams of vinyl chloride in the presence of 1.5 grams benzoyl peroxide in a manner similar to that described in (a). Yield of reaction product was 171.9 grams which contained 31.4 percent total polymerized vinyl chloride as determined by chlorine analysis. A pressed 10 mil film of this product was transparent, tough and quite stiff. The product contained 23.2 percent vinyl chloride homopolymer and 8% polymerized vinyl chloride as graft copolymer as determined by extraction with cyclohexanone with subsequent chlorine analysis.

(c) One hundred fifty grams of polyethylene were dissolved with heat in 750 grams of benzene and reacted with 1.5 grams benzoyl peroxide and 135.5 grams of vinyl chloride in a manner similar to that described in (a). Yield of gross reaction product was 185.1 grams which contained 22.04 percent total polymerized vinyl chloride by chlorine analysis. The product was similar to that described in (b) and contained 16.1 percent vinyl chloride homopolymer and 6% polymerized vinyl chloride as graft copolymer determined as in (b).

(d) One hundred fifty grams of polyethylene were dissolved with heat in 750 grams of benzene and reacted with one gram benzoyl peroxide and 98 grams vinyl chloride in a manner similar to that of (a) except that at the end of three hours' reaction an additional 0.5 gram peroxide catalyst in 10 cc. benzene was added and at the end of six hours an additional 0.5 gram peroxide catalyst and again at the end of nine hours. Reaction was continued for an additional eight hours. The dried gross reaction product contained 21.3 percent total polymerized vinyl chloride by chlorine analysis; or 12.8 percent vinyl chloride homopolymer and 8.7% polymerized vinyl chloride as graft copolymer as determined by extraction with cyclohexanone with subsequent chlorine analysis.

(e) An equal blend by weight of the products from (a) and (c) was injection molded at 120° C. and at a pressure of 17,900 p.s.i. The tensile strength of this molded blended product was 2500 p.s.i. at 25° C. and modulus of elasticity was 30,000 p.s.i. at 25° C.

*Example 4*

(a) One hundred fifty grams of polyethylene (M.W. 21,000) were dissolved in 750 grams of refluxing benzene and then reacted with 1.5 grams of benzoyl peroxide and 154 grams vinyl chloride at a gauge pressure of 95–110 p.s.i. Temperature of the reaction was 69° C.–71° C. and time of the reaction about 29 hours. A portion of the final reaction mixture was dried to remove volatiles and the dried reaction product was found to contain 21.4% total polymerized vinyl chloride by chlorine analysis. The remainder of the reaction solution was cooled and diluted with 500 grams of benzene and the graft copolymer and polyethylene homopolymer were precipitated with the addition of 1500 grams of acetone. The precipitate was filtered off and dried in vacuo. The product thus obtained contained 5.9% polymerized vinyl chloride as graft copolymer and 1.2% vinyl chloride homopolymer as determined by cyclohexanone extraction with subsequent chlorine analysis.

(b) A reaction was carried out similar to (a) and a sample of the gross reaction product contained 22.3% polymerized vinyl chloride and had an intrinsic viscosity in toluene at 70° C. of 0.75. The reaction solution was not diluted down with benzene before precipitating the graft copolymer with the addition of 1500 grams of acetone. The precipitate was filtered and dried as in (a). The product thus obtained contained 7.7% polymerized vinyl chloride as graft copolymer and 2.7% vinyl chloride homopolymer as determined by cyclohexanone extraction with subsequent analysis for chlorine. The intrinsic viscosity of this product in toluene at 70° C. was 0.85.

It is apparent from this experiment that the addition of acetone to the reaction mixture on completion of the reaction does not entirely remove all of the vinyl chloride homopolymer, however, films pressed from the products from (a) and (b) were transparent and could be easily cold drawn without blushing.

*Example 5*

(a) One hundred fifty grams polyethylene were dissolved in 750 grams of hot benzene and then reacted with 2.5 grams of benzoyl peroxide and 191 grams vinyl chloride under gauge pressure of 85–100 p.s.i. and temperature of 65° C.–72° C. for a reaction time of 24 hours. The resulting reaction product contained a total polymerized vinyl chloride content of 34.4% as determined by chlorine analysis (which represents about 41.0% conversion of the vinyl chloride used) a vinyl chloride homopolymer content of 25.1% and 9.3% polymerized vinyl chloride as graft copolymer as determined by cyclohexanone extraction with subsequent chlorine analysis.

A portion of the above product was milled on hot rolls (105° C.–115° C.) and blended with 4.0% by weight of dibutyl tin laurate as stabilizer. An 8 mil film of the stabilized product was clear, transparent, flexible but broke easily when cold drawn and showed some signs of incompatibility. A film pressed of the product, from which the vinyl chloride homopolymer had been removed was clear, transparent, flexible and could be readily cold drawn with no evidence of incompatibility.

(b) An experiment similar to (a) was performed using the same amounts of polyethylene, catalyst, and benzene but a larger amount, 215 grams, of vinyl chloride. Otherwise conditions were similar.

The resulting reaction product contained about 49.9% total polymerized vinyl chloride which represented about 58.8% conversion of vinyl chloride used in the example. The content of vinyl chloride homopolymer was 38.7% and that of polymerized vinyl chloride as graft copolymer was 11.2% as determined by extraction and chlorine analysis. A film pressed of this product was clear, transparent, flexible but broke easily when cold drawn. A film pressed of the product from which the vinyl chloride homopolymer had been removed could be easily cold drawn without any signs of incompatibility.

*Example 6*

One hundred fifty grams of polyethylene were dissolved in 750 grams of hot benzene and reacted with 0.65 gram benzoyl peroxide and 66 grams vinyl chloride under gauge pressure of 85–100 p.s.i. and temperature of 70° C. for a reaction time of 24 hours. The resulting reaction product contained a total polymerized vinyl chloride content of 7.8% as determined by chlorine analysis (which represents about 19.2% conversion of the monomer); a vinyl chloride homopolymer content of 4.04% and 3.6% polymerized vinyl chloride as graft copolymer as determined by cyclohexanone extraction with subsequent chlorine analysis.

*Example 7*

One hundred fifty grams of polyethylene were dissolved in 900 grams of hot benzene at a temperature of 80° C. after the system was purged of air with nitrogen. The mixture was reacted with .65 gram benzoyl peroxide and 69 grams of vinyl chloride under a gauge pressure of 90–125 p.s.i. and a temperature of 80° C. for a reaction time of 21 hours. The resulting reaction product contained a total polymerized vinyl chloride content of 5.8% as determined by chlorine analysis which represents about 13.5% conversion of the monomer and a vinyl chloride homopolymer content of 2.7% and 3.0% of polymeized vinyl chloride as graft polymer as determined by cyclohexanone extraction with subsequent chlorine analysis.

The following table summarizes the data given in the various examples and illustrates the effect of varying the weight ratio of vinyl chloride to polyethylene. It appears on the basis of these data that generally speaking a decreasing charge ratio gives a greater degree of grafting efficiency.

| Product | Charge Ratio by Weight of Vinyl Chloride to Polyethylene | Total percent Polymerized Vinyl Chloride | Percent Vinyl Chloride Homopolymer | Grafting Efficiency [1] |
|---|---|---|---|---|
| Ex. 6 | 0.44/1 | 7.8 | 4.04 | 50 |
| Ex. 7 | .46/1 | 5.8 | 2.7 | 53 |
| Ex. 3(d) | .65/1 | 21.3 | 12.8 | 40 |
| Ex. 3(c) | .90/1 | 22.0 | 16.1 | 27 |
| Ex. 3(a) | 1.06/1 | 23.8 | 17.5 | 27 |
| Ex. 3(b) | 1.04/1 | 31.4 | 23.2 | 26 |
| Ex. 5(a) | 1.27/1 | 34.4 | 25.1 | 27 |
| Ex. 5(b) | 1.43/1 | 49.9 | 38.7 | 22 |
| Ex. 1(a) | 1.65/1 | 27.5 | 21.5 | 22 |

[1] Grafting efficiency $= \dfrac{A-B}{A}$ where A=percent total polymerized vinyl chloride in gross reaction product and B=percent vinyl chloride homopolymer in gross reaction product.

What is claimed is:
1. The process which consists in reacting, in the presence of benzoyl peroxide, vinyl chloride with a preformed normally solid polyethylene, said polyethylene being dissolved in an aromatic solvent therefor.
2. Process according to claim 1 in which the aromatic solvent is a hydrocarbon.
3. The process which includes the step of heating a mixture consisting of vinyl chloride, preformed normally solid polyethylene dissolved in an aromatic solvent therefor and benzoyl peroxide, at a temperature between about 50° C. and 100° C. and under sufficient pressure to maintain a solution of the vinyl chloride in the aromatic solvent to form a homogeneous mixture comprising ethylene homopolymer, polyvinyl chloride and a graft copolymer of polyethylene and vinyl chloride, and thereafter removing said aromatic solvent.
4. As a new composition of matter, the homogeneous composition consisting of homopolymeric ethylene, homopolymeric vinyl chloride and a thermoplastic graft copolymer produced by the process of claim 3, said graft copolymer being further characterized as being composed of homopolymeric ethylene having chemically bonded thereto side chains consisting of homopolymeric vinyl chloride.
5. The process according to claim 3 wherein the vinyl chloride and preformed normally solid polyethylene are employed in proportions of from about 0.44 to about 1.65 parts by weight vinyl chloride per part polyethylene.
6. The process according to claim 3 which includes the further step of separating the polyvinyl chloride from the homogeneous mixture.
7. Process according to claim 6 in which the heating occurs in an atmosphere of nitrogen.

References Cited in the file of this patent
UNITED STATES PATENTS

| | | |
|---|---|---|
| 2,405,817 | D'Alelio | Aug. 13, 1946 |
| 2,497,323 | Roedel | Feb. 14, 1950 |
| 2,520,959 | Powers | Sept. 5, 1950 |
| 2,542,771 | Hanford et al. | Feb. 20, 1951 |
| 2,610,962 | Smyers et al. | Sept. 16, 1952 |
| 2,837,496 | Vandenberg | June 3, 1958 |

OTHER REFERENCES

Journal of Polymer Science, volume VIII, pages 257–277, particularly page 260 (1952).

Brown: "The Chemistry of High Polymers," page 20, Interscience Pub., Inc., New York (1948).